United States Patent
Abraham et al.

(10) Patent No.: US 7,031,254 B2
(45) Date of Patent: Apr. 18, 2006

(54) RATE CONTROL SYSTEM AND METHOD FOR A LINK WITHIN A WIRELESS COMMUNICATIONS SYSTEM

(75) Inventors: Santosh P Abraham, Keasbey, NJ (US); Mooi Choo Chuah, Marlboro, NJ (US); Ashwin Sampath, Somerset, NJ (US); Cem Uygur Saraydar, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 940 days.

(21) Appl. No.: 10/057,449

(22) Filed: Jan. 25, 2002

(65) Prior Publication Data

US 2003/0156580 A1    Aug. 21, 2003

(51) Int. Cl.
*H04L 12/26* (2006.01)
(52) U.S. Cl. ........................... 370/229; 370/310
(58) Field of Classification Search ................ 370/229, 370/230, 230.1, 232, 235, 238, 310, 310.2, 370/328, 338, 389, 470; 709/105
See application file for complete search history.

(56) References Cited

U.S. PATENT DOCUMENTS

| 4,771,391 A | * | 9/1988 | Blasbalg ............... 709/232 |
| 5,649,299 A | * | 7/1997 | Battin et al. ............ 455/62 |
| 2003/0081628 A1 | * | 5/2003 | Sugar et al. ............ 370/461 |

FOREIGN PATENT DOCUMENTS

| WO | WO 99/52307 | 10/1999 |
| WO | WO 01/63856 | 8/2001 |

\* cited by examiner

*Primary Examiner*—Brenda Pham
(74) *Attorney, Agent, or Firm*—Julio Garceran

(57) ABSTRACT

A rate control system is provided for a link between a first node, such as an RNC and a second node, such as a Node B, within a wireless communications system where at least one user is provided a rate over the link as a function of link load. For example, the rate control system sets at least one user to a reduced rate on the link as a function of the rates of a plurality of users on the link. In certain embodiments, the rate control system controls the rate by selecting the size of a transport format block used to transport data for a user over the link during a transmission interval. The size of the transport format block can be selected by changing the number of transport blocks used to form the transport format block as a function of the total user data to be transported over the link at that time. The rate of data offered to the link can be controlled by the way user data is mapped into the transport format blocks used to send user data over the link. In a current UMTS systems, as long as the data present in a particular RLC buffer exceeds the size of the largest TFB, the largest TFB is used to pass the data to the next layer. With the rate control system, the size of the TFB for a particular user is determined based on the current status of all the RLC buffers that have data to transmit. If there is more data than the Iub link can carry at that point in time, then smaller TFBs are used for some of the users such that the aggregate traffic offered remains below the sustainable rate.

5 Claims, 2 Drawing Sheets

RATE CONTROL SYSTEM AND METHOD FOR A LINK WITHIN A WIRELESS COMMUNICATIONS SYSTEM

BACKGROUND OF THE INVENTION

1. Field of the Invention

This invention relates to communications and, more particularly, to a rate control system for a wireless communications system.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular stream from a received signal using the appropriate code or sequence to decode the received signal.

Due to the delay-intolerant nature of voice communication, wireless units in conventional cellular systems transmit and receive over dedicated channels between a wireless unit and a base station. Generally, each active wireless unit requires the assignment of a dedicated link on the forward link and a dedicated link on the reverse link. Current wireless communications systems are evolving which provide access to packet data networks, such as the Internet, and support a variety of data services. For example, support for multimedia applications (voice, video and data) is important for any network connected to the Internet. These applications have specific requirements in terms of delay and bandwidth. Traditional data applications are typically bursty and, unlike voice communications, relatively delay tolerant. As such, using dedicated links to transmit data is an inefficient use of network resources. Consequently, resource allocation systems have been devised to make more efficient use of network resources using different quality of service (QoS) classes for the different types of traffic based on the delay-tolerant nature of the traffic.

The Universal Mobile Telecommunications System (UMTS) was designed to offer more wireless link bandwidth and QoS features. FIG. 1 shows a typical UMTS network 10 which can be divided into a radio access network (RAN) 12 and a core network (CN) 14. The RAN 12 comprises the equipment used to support wireless interfaces 16a–b between a wireless unit 18a–b and the UMTS network 10. The RAN 12 includes Node Bs or base stations 20a–c connected over links (Iub links) 21a–c to radio network or base station controllers (RNC) 22a–b. The interface between the base station and the RNC is referred to as the Iub interface or link, and the interface between two RNCs is referred to as the Iur interface although UMTS Release 99 does not require Iur to support routing. Currently, both the Iub and Iur interfaces are based on ATM, and ATM switches are allowed between Node Bs and RNCs in UMTS Release 99 architecture.

The core network 14 comprises the network elements that support circuit based communications as well as packet-based communications. In establishing a circuit channel to handle circuit-based communications between the wireless unit 18b and a public switched telephone network (PSTN) 24 or another wireless unit, the base station 20b receives (in the uplink) and transmits (in the downlink), the coded information (circuit voice or circuit switched data) over the wireless interface or link 16b. The RNC 22b is responsible for frame selection, encryption and handling of access network mobility. The RNC 22b forwards the circuit voice and circuit switched data over a network, such as an asynchronous transfer mode (ATM)/Internet Protocol (IP) network to a 3G mobile switching center (MSC) 30. The 3G-MSC 30 is responsible for call processing and macromobility on the MSC level. The 3G-MSC 30 establishes the connectivity between the wireless unit 18b and the PSTN 24.

In establishing a packet channel to handle packet-based communications between the wireless unit 18a and a packet data network (PDN) 34, such as the Internet, the base station 20a receives (in the uplink) and transmits (in the downlink), the coded information over the wireless interface or link 16a. In the uplink direction, the RNC 22a reassembles the packets as sent by the wireless unit 18 and forwards them to SGSN 40. In the downlink direction, the RNC 22a receives the packets and segments them into the right size transport frames or blocks to be transferred across the wireless link 16a. The SGSN 40 provides packet data session processing and macromobility support in the UMTS network 10. The SGSN 40 establishes connectivity between the wireless unit 18a and the PDN 34. A GGSN 42 is the gateway to external PDNs. The GGSN 42 acts upon requests from the SGSN 40 for packet data protocol (PDP) session establishment.

On the downlink in a current system, after data is generated and arrives at the RNC 22a from the network, it is mapped to Iub frames before being sent on the Iub-link 21a. For example, once the TTI (Transmission Time Interval) and the Radio Bearer Rate (ranging from 64 Kbps to 384 Kbps for web-browsing interactive service) are given, the mapping can be determined by looking up the corresponding parameters, such as the transport format set shown in Table 1 below. In a current UMTS system, each incoming packet is mapped to the least possible number of frames or TTIs. In this example, after the medium access control (MAC) maps the incoming packet into frames and adds the appropriate headers, the frames are passed onto the dedicated channel framing protocol (DCHFP) layer. The DCHFP layer adds framing protocol headers to the frames to get the Iub frames. The Framing Protocol-Protocol Data Unit (FP PDU) is then passed to the ATM adaptation layer (AAL2) layer described in the standard identified as ITU-T I.363.2. FP PDUs from different terminals are appended with the AAL2 header that identifies the particular wireless unit or user to which the frames belong. These AAL2 layer frames are then packed into ATM cells before being transmitted on the Iub link. The link from RNC to Node B can have a variety of different bandwidths, such as T1 (1536 Kbps) or E1 (1920 Kbps).

Accordingly, at the RNC, data is received for each UE, and the user data packets go through various layers before actually being transmitted on the Iub link. The incoming data packets are fragmented and appropriate overheads are added before being sent on the Iub link depending on the type of data service being provided. Each packet data service belongs to one of the 4 QoS classes as specified in the 3 GPP standards: conversational, interactive, streaming and background. Table 1 shows a typical parameter set for the transport channel for the interactive class. In this example, the transport format set (TFS) contains 5 different transport formats or sizes (TF0–TF4). As shown in Table 1, if transport format TF1 is selected, one 42 byte transport block is sent during the TTI (for example, 20 ms.). If the largest transport format TF4 is selected for sending data over the duration of a TTI, then four (4) 42 byte transport blocks are sent during the TTI, giving the user the peak rate of 64 Kbps. The TFS will be different based on the type of service, and the Radio Bearer Rate and the TTI. In this example, the MAC layer processes the user data according to the specified TFS. The transport format can be referred to as transport format block (TFB) or transport block set size.

TABLE 1

Transport Format Set for the Interactive/background service type for the 64 Kbps Radio Bearer.
Transport channel parameters for Interactive or background/64 Kbps PS RAB

| RLC | |
|---|---|
| Logical channel type | DTCH |
| RLC mode | AM |
| Payload sizes, byte | 40 |
| Max data rate, kbps | 64 |
| RLC header, byte | 2 |
| MAC | |
| MAC header, byte | 0 |
| MAC multiplexing | N/A |
| Layer 1 | |
| TrCH type | DCH |
| TB sizes, bytes | 42 |
| TFS | |
| TF0, bytes | 0 × 42 |
| TF1, bytes | 1 × 42 |
| TF2, bytes | 2 × 42 |
| TF3, bytes | 3 × 42 |
| TF4, bytes | 4 × 42 |
| TTI, ms | 20 |

When data is received by the RNC for a particular wireless unit or user, the MAC layer creates the appropriate TFB and passes it to the next layer. For example, suppose the RLC buffer holds a 1500 byte packet. The MAC would create 9 TF4's (each with size 160 bytes) which would hold 1440 bytes of user data. The remaining 60 bytes would be placed in the smallest TFB that would hold it, namely TF2 (size 80 bytes).

Due to soft handoff in CDMA systems, there is a strict deadline for transmission of frames from the Node B to the user after the call is established. If a frame arrives at the NodeB after the deadline has passed, the frame is discarded, thus affecting the quality of service. In order to provide reasonable bandwidth utilization on the Iub interface or link (defined as the average fraction of time the link is in use), statistical multiplexing of sources is necessary, leading to variable arrival times (jitter) at the NodeB. Due to the statistical multiplexing on the Iub link, there may be temporary periods when the offered traffic (measured as the total offered bit rate across all sources being multiplexed) exceeds the capacity of the Iub link. For example, one potential problem with the mapping of user data to TFBs as described above is that the offered traffic might well exceed the capacity of the Iub link. For example, with overheads, the peak rate of a user is around 82.5 Kbps. For a T1 link (1536 Kbps), the number of users that can be supported at full rate are 1536/82.5=18. If the number of users with non-empty RLC buffers exceed 18 at any given point in time, then the input rate to the Iub is more than it can handle. Thus excessive frame discards occur at the Node B, in addition to the inefficient use of the link in terms of link utilization.

SUMMARY OF THE INVENTION

The present invention is a rate control system for a link between a first node, such as an RNC and a second node, such as a Node B, within a wireless communications system where at least one user is provided a rate over the link as a function of link load. For example, the rate control system sets at least one user to a reduced rate on the link as a function of the rates of a plurality of users on the link. In certain embodiments, the rate control system controls the rate by selecting the size of a transport format block used to transport data for a user over the link during a transmission interval. The size of the transport format block can be selected by changing the number of transport blocks used to form the transport format block as a function of the total user data to be transported over the link at that time. The rate of data offered to the link can be controlled by the way user data is mapped into the transport format blocks used to send user data over the link. In a current UMTS systems, as long as the data present in a particular RLC buffer exceeds the size of the largest TFB, the largest TFB is used to pass the data to the next layer. With the rate control system, the size of the TFB for a particular user is determined based on the current status of all the RLC buffers that have data to transmit. If there is more data than the Iub link can carry at that point in time, then smaller TFBs are used for some of the users such that the aggregate traffic offered remains below the sustainable rate.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments of the rate control system for a link between a RNC and a Node B are described with respect to a radio access network of a UMTS system. The rate control system can be used in other wireless communications system architectures. In a radio access network of a UMTS system, a Node B can be referred to as a base station, and a radio network controller (RNC) can be referred to as a base station controller. The radio access network in a UMTS system comprises at least the Node Bs and the RNCs.

In certain embodiments of the rate control system, if the threshold number of users that can be supported at full rate is T and the "equivalent" number of users at peak rate, $N_P$, exceeds the threshold T, then the rate control system takes action to adjust the rate for each user. The use of the phrase "equivalent" number of users at peak rate can be explained as follows. If at some instance in time, there are a total of 4 users with non-empty RLC buffers. If 2 of these users are currently transmitting at the peak rate of 64 Kbps and 2 users transmitting at 32 Kbps, then the "equivalent" number of users at peak rate is 3.

Figure 1:
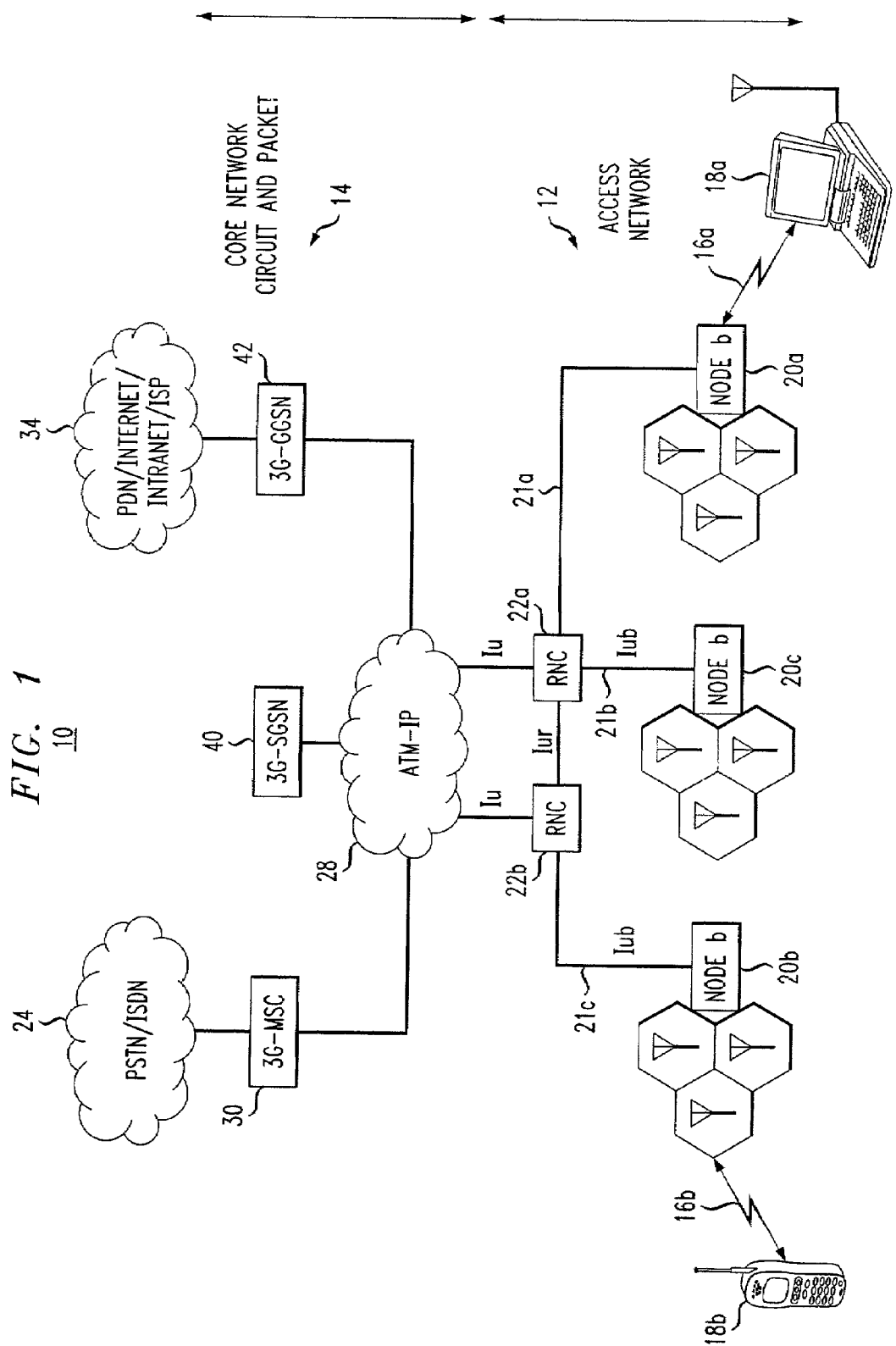
FIG. 1 shows a general block diagram of a UMTS network architecture according to the prior art.
Figure 2:
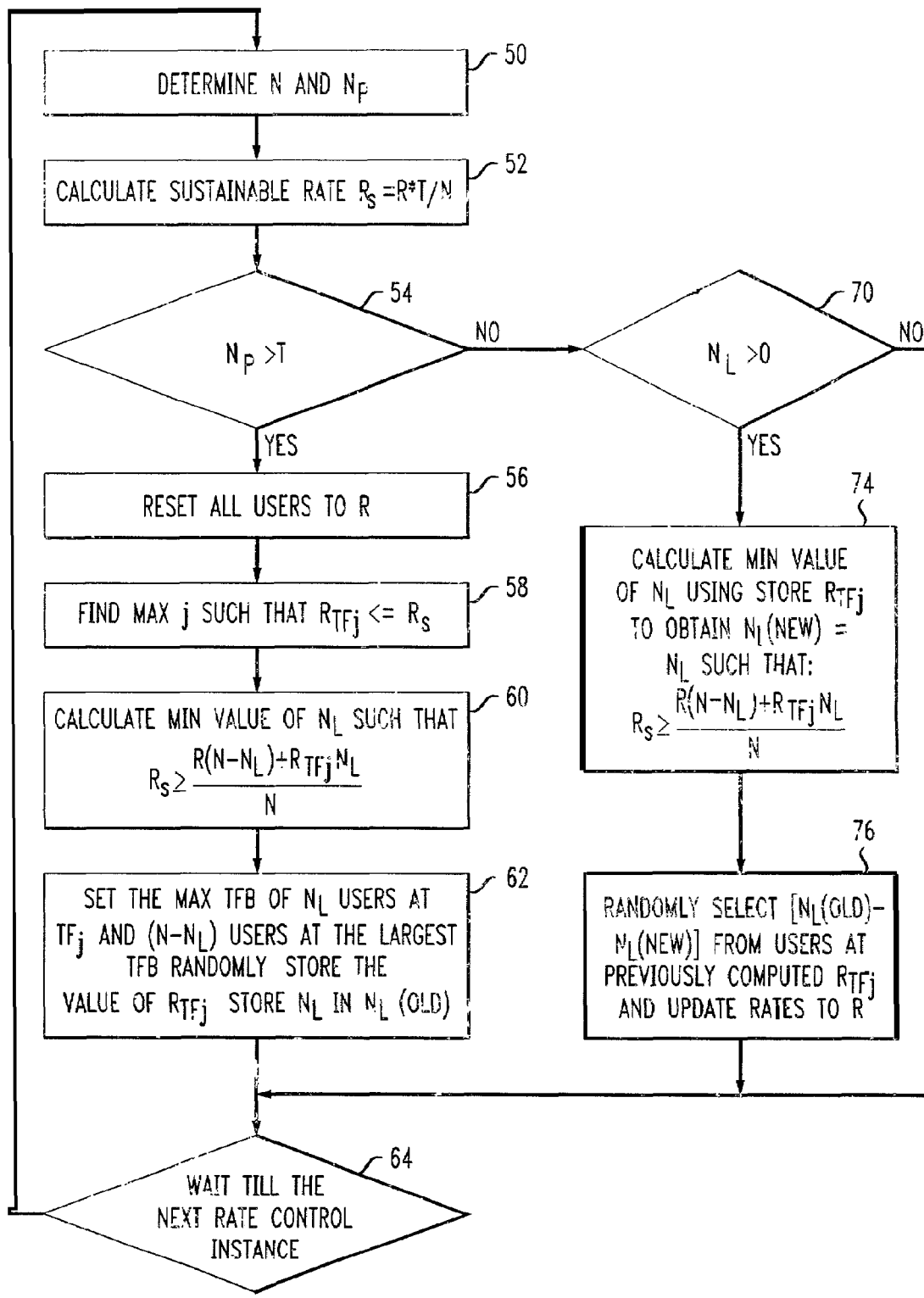
FIG. 2 shows a flow diagram of an embodiment of the rate control system in a UMTS network according to according to principles of the present invention.

FIG. 2 shows a flow chart of a downlink embodiment of the rate control system for links between Node Bs and RNCs in a radio access network. First, the following terms are defined as:

T threshold number of users $N_P$ the equivalent number of users at peak rate

N the number of users with non-empty RLC buffers

R peak rate, also referred to as the Radio Bearer Rate, or the full rate $R_{TFj}$ the rate that corresponds to TFj (Table 2), also referred to as reduced rate $R_S$ the rate that can be sustained per user at some given point in time $N_L$ the number of users that are forced to lower rate by rate control Rate control instance The time at which either at least one empty RLC buffers receives data or at least one RLC buffer is left with no data.

Max TFB size The largest block the user is allowed to use within the TFS.

TABLE 2

The transport format block sizes given in Table 1 and the corresponding bit rates.

| Index j | Max TFB size (byte) | $R_{TFj}$ (Kbps) |
|---|---|---|
| 0 | 0 | 0 |
| 1 | 40 | 16 |
| 2 | 80 | 32 |
| 3 | 120 | 48 |
| 4 | 160 | 64 |

In FIG. 2, a rate control system, which can be referred to as a Fair Rate Control (FRC) system, determines the number of users N with non-empty RLC buffers and the equivalent number $N_P$ of users operating at peak rate at block 50. The sustainable rate per user $R_s$ is calculated at block 52 as R*T/N. At block 54, a determination is made whether $N_P$>T. If so, the rate control system determines that the link is congested and proceeds to block 56 where all users are reset to being assigned the peak rate R in this embodiment to make fair the subsequent random assignment of $N_L$ users to a lower rate $R_{TFj}$. As such, in this embodiment, a user assigned to a lower rate may not be maintained at the lower rate.

The rate control system proceeds to block 58 to determine the TFB size corresponding to the largest rate per user $R_{TFj}$ which can be handled by the Iub link, for example by finding the maximum index j to Table 2 such that the largest $R_{TFj}$ is found where $R_{TFj}<=R_s$. At block 60, the minimum value of users forced to lower rate $N_L$ is determined, for example by finding the minimum value of $N_L$ such that:

$$R_s \geq \frac{R(N - N_L) + R_{TFj}N_L}{N} \quad (1)$$

At block 62, this embodiment of the rate control system selects $N_L$ users at random whose rate is to be reduced by setting the TFB size (or rate) of $N_L$ users to TFj (or $R_{TFj}$) and the TFB size (or rate) of N-$N_L$ users at the largest TFB size (or peak rate). Additionally, the value for $R_{TFj}$ is stored or retained, and the value of $N_L$ is stored in $N_L$(old). In this embodiment, the rate control system waits until the next rate control instance at block 64 and proceeds back to block 50.

If, at block 54, Np<=T, the rate control system determines that the link is not congested and proceeds to block 70 to determine whether $N_L$ is greater than 0. If not, no users are at a reduced rated, and the rate control system proceeds to block 64 to wait until the next rate control instance. Otherwise, at block 74, the rate control system uses the stored $R_{TFj}$ and finds the minimum number of users $N_L$ which need to be forced to the lower rate which satisfies the equation (1) to obtain $N_L$(new)=$N_L$. At block 76, the rate control system randomly sets the rate for $N_L$(old)-$N_L$(new) users from users at the previously computed $R_{TFj}$ to the largest TFB size or rate R. In this embodiment, the rate control system waits until the next rate control instance at block 64 and proceeds back to block 50.

In this embodiment, at any point in time, there are exactly two sets of users: 1) users at full rate and 2) users at the reduced rate. Alternative embodiments are available where at any point in time users can be set to more than one reduced rate.

In this embodiment, each rate control instance is initiated by a change in state in at least one user's buffer. The rate adjustment is done at the so-called rate control instances. In this embodiment, the rate control instances are those instances where there occurs a state change in the RLC buffer of any user, from the empty state to the non-empty state or vice versa. Denote the former type of instance by RCE1 (rate control event of type 1) and the latter by RCE2 (rate control event of type 2). If RCE1 occurs, both N and $N_P$ are incremented exactly by 1 as compared to the value computed at the previous rate control instance. If case RCE2 occurs, there are two possibilities. Either a full rate user has initiated the RCE2, in which case both N and $N_P$ are decremented exactly by one, or a reduced rate user has initiated the RCE2, in which case N is decremented by one, however, $N_P$ is decremented by the ratio of the reduced rate to the full rate. For example, if a user with 32 Kbps initiates an RCE2, then $N_P$ decrements by 0.5 for a 64 Kbps service.

Alternative embodiments are available. For example, an embodiment which can be referred to as Unfair Rate Control (URC) determines the number of users that can be supported at full rate and gives only so many users the peak rate. All other users with data to transmit will be given zero rate, i.e. their transmission will be delayed until the load on the Iub link improves. One can think of URC as a special case of FRC where the reduced rate is fixed as $R_{TFj}$=0.

The rate control algorithm FRC described above represents an ideal case. There is a certain amount of control traffic generated to communicate the rate control action. The selection of the buffers that need to be driven to lower rate in the FRC is shown to be random as indicated in FIG. 2. When the choice is random, there is a more fair distribution among low rate and high rate users. However, there might be cases where from one rate control instance to the next, a user is still active and it is driven from reduced rate to peak rate. Such action generates the control traffic that commands the appropriate RLC layer to take appropriate action. If the rate control system is designed such that the reduced rate users continue at the reduced rate at the next rate control instance rather than randomly select reduced rate users, then some associated control messages can be saved (at the expense of being unfair). Such savings, when accumulated, could bring considerable relief to the burden on the associated network elements. The trade-off is the deterioration in performance of some of the users, while the average performance across all users should remain the same. Embodiments could maintain reduced rate users at a reduced rate for a certain number of rate control instances after which the rate for a reduced rate user is randomly selected.

Additionally, the rate control system in FIG. 2 would work well when all the users have the same peak bearer rate. However, if the users have different peak bearer rate allocations then a variety of options are available for the rate control system. The choice of an appropriate system should consider the pricing model used for the different bearer rates. For example, another embodiment of the rate control system can be referred to as Approximate Max-Min Fair Rate Allocation. The goal of this embodiment of the rate control system is to ensure that the rates of users in the higher bandwidth classes are reduced before the rates in the lower user classes. However, in order to retain service differentiation, we ensure that the maximum rate of users in a lower class is always lower than the minimum rate of users in the just higher class.

In order to adequately define this algorithm we need the following notation. Let $C_i$, i=1, ... M, denote the set of users in classes or bearer rates 1, . . . , M. The classes are ordered so that the maximum bearer rate of users in class n is larger than the maximum bearer rate for users in class n+1. For a user $j \in C_i$, let $r_j$ denote rate on the Iub link and let $I_j=1$ if user j has data to send, other wise $I_j=0$. The Iub link capacity is denoted by $R_{Iub}$. When there is congestion at the Iub link, this embodiment of the rate control system searches for a rate allocation that satisfies the following conditions.

$$\sum_{i=1}^{M} \sum_{j \in C_i} I_j r_j \leq R_{Iub}$$

$$\min_{j \in C_n} r_j \geq \max_{k \in C_{n+1}} r_k \quad n = 1, \ldots, M-1$$

3. The vector of rates $\{r_j\}$ $j \in C_n$, n=1, . . . , M−1 is lexicographically highest among all vectors that satisfy 1 and 2.

For a definition of lexicographical ordering, let $x=(x_1, x_2, \ldots, x_n)$ denote a vector and $\tilde{x}=(\tilde{x}_1, \tilde{x}_2, \ldots, \tilde{x}_n)$, denote a vector with the elements of x arranged in ascending order. Let $x=(x_1, \ldots, x_n)$ and $y=(y_1, \ldots, y_n)$ denote two vectors. Then y is defined to be lexicographically larger than x if $\tilde{y}_1 > \tilde{x}_1$, or if $\tilde{y}_1 = \tilde{x}_1$, then $\tilde{y}_2 > \tilde{x}_2$ etc.

Due to condition 3, this embodiment of the rate control system attempts to obtain highest possible utilization of the Iub link rate control system. Condition 1 ensures that the Iub link is not congested. Condition 2 ensures that all users in a higher class are never allocated a rate that is lower than a user in a lower rate class.

A generalized rate control system to compute the rate allocation on a continuum that satisfies conditions 1, 2 and 3 can be developed as would be understood by one of skill in the art. By restricting the available TFB sizes, a simpler implementation is possible, for example, in the case where only three bearer rates are available i.e. 384K, 128K and 64K and a limited number of TFB sizes within each bearer rate are available. The embodiment of the rate control system can be easily extended to cases with more or less numbers of bearer rates. In Table 3, the possible bearer rates are provided with the permitted transport formats for each of the bearer rates. The Iub link rate corresponding to the transport format block (TFB) sizes is also provided. The Iub link rate takes into account all the overheads from the framing protocol and the ATM/AAL2 layer. Table 3 thus presents the feasible rates for each of the bearers. The task of this rate control algorithm is to select or search for a combination of TFBs that would accomplish the above objectives of 1, 2 and 3.

Accordingly, the embodiment of the rate control system allocates a TFB to a user within a bearer rate as a function of the link load which can be measured in a variety of ways, for example based on the number of users and their assigned rates or TFBs or the amount of data to be transmitted over the link at the time by a plurality of users. Instead, current systems would assign TFBs to a user in a bearer rate based simply on the amount of data the user had to transmit.

TABLE 3

Transport format block sizes and corresponding Iub link rate requirements for different bearer rates(the Iub rate calculations are approximate and exemplary)

| 384 Kb/s TFB (bytes) | Iub Link Rate for 384 K (Kb/s) | 128 Kb/s TFB (bytes) | Iub Link Rate for 128 K (Kb/s) | 64 Kb/s TFB (bytes) | Iub Link Rate for 64 K (Kb/s) |
|---|---|---|---|---|---|
| 960 | 479.0 | 320 | 162.3 | 160 | 82.5 |
| 800 | 400.54 | 160 | 82.5 | 120 | 63.6 |
| 640 | 320.7 | 80 | 43.4 | 80 | 43.4 |
| 480 | 240.9 | 40 | 23.0 | 40 | 23.0 |
| 320 | 162.3 | 0 | 0 | 0 | 0 |
| 160 | 82.5 | | | | |
| 80 | 43.4 | | | | |
| 40 | 23.0 | | | | |
| 0 | 0 | | | | |

The embodiment of FIG. 2 involves a rate control system for a single service or class (bearer rate). Other embodiments of the rate control system can provide link rate control over multiple bearer rates. To restrict the possible combinations, this embodiment of the rate control system can use a look-up table with multiple bearer rates, such as Table 4. The rate control system can search Table 4 using the conditions 1, 2, and 3 above to assign rates to users over the Iub link. Other embodiments are possible.

TABLE 4

Search sequences for 3 bearer rates

| Search Sequence | 384 Kb/s Bearer (Class 1) | 128 Kb/s bearer (Class 2) | 64 Kb/s bearer (Class 3) | Possible Rate Increase class (change class) |
|---|---|---|---|---|
| 1 | 479 | 162.3 | 82.5 | — |
| 2 | 400.54 | 162.3 | 82.5 | 1 |
| 3 | 320.7 | 162.3 | 82.5 | 1 |
| 4 | 240.9 | 162.3 | 82.5 | 1 |
| 5 | 162.3 | 162.3 | 82.5 | 1 |
| 6 | 162.3 | 82.5 | 82.5 | 2 |
| 7 | 82.5 | 82.5 | 82.5 | 1 |
| 8 | 82.5 | 82.5 | 63.9 | 3 |
| 9 | 82.5 | 82.5 | 43.4 | 3 |
| 10 | 82.5 | 43.4 | 43.4 | 2 |
| 11 | 43.4 | 43.4 | 43.4 | 1 |

TABLE 4-continued

Search sequences for 3 bearer rates

| Search Sequence | 384 Kb/s Bearer (Class 1) | 128 Kb/s bearer (Class 2) | 64 Kb/s bearer (Class 3) | Possible Rate Increase class (change class) |
|---|---|---|---|---|
| 12 | 43.4 | 43.4 | 23 | 3 |
| 13 | 43.4 | 23 | 23 | 2 |
| 14 | 23 | 23 | 23 | 1 |
| 15 | 23 | 23 | 0 | 3 |
| 16 | 23 | 0 | 0 | 2 |

In this embodiment, the sequence with the lowest sequence number that satisfies condition 1 is searched for, i.e., when the rates for active users are set corresponding to the rate allocation given in the search sequence for the class. Let n denote the search sequence index returned. The rate control system changes the TFB of the users to the TFB sizes corresponding to the rates returned by the search sequence n.

In order to maximize utilization, the rate control system may need to increase the rate allocation of some of the sessions in a rate class. If n>1, then the rate allocations for the user should lie between the rates in the search sequences n and n−1. If n=1, all users can be supported at their respective maximum bearer rates. For any search sequence n, n>1, the users are considered in the class whose rates were reduce from search sequence n−1. For example, for search sequence 2, users in Class 1 are considered; for search sequence 6, users in Class 2 are considered; and for search sequence 12, Class 3 is considered. The rate of a subset of the users is increased in the "change class" until the maximum possible utilization of the Iub is achieved.

To obtain the number of users in the "change class" whose rates can be increased, we use the following calculation. Let $r_{ij}$ denote the rate for class i users in sequence j. Let n be the sequence returned from the search procedure and k be the "change class" corresponding to sequence n. Let $c_i$ denote the number of active users in class i, i=1,2,3 and l denote the number of active users in the change class i.e., k, whose rates can be increased.

$$R_n = R_{lub} - \sum_{m=1, m \neq k}^{3} C_m r_{mn} \quad [2]$$

$$l = \left\lfloor \frac{R_n - c_k r_{kn}}{r_{k(n-1)} - r_{kn}} \right\rfloor$$

The storage requirements for a table such as Table 4 are small. The first step, i.e., searching for the appropriate search sequence, only requires the number of active users in each class. Then, a simple calculation (as shown in Equation [2]) is required to determine the number of users in the "change class" whose rates can be increased. If simulation results show that we do not lose too much capacity without doing this simple calculation, this step can be skipped. Table 4 determines the allocation strategy. It might be necessary to provide other allocation strategies depending on the pricing model, this is easily done by modifying Table 4.

Other alternative embodiments are possible. For example, the following describes a system which conforms to the following conditions:

$$\sum_{i=1}^{P} \sum_{j=1}^{M_i} \sum_{k \in C_i} I_k r_k \leq R_{lub}$$

2. For all $r_j$, $j \in C_n$ and $r_k$, $k \in C_{n+1}$, and $r_j \neq 0$, $$\min_{j \in C_{in}} r_j > \max_{k \in C_{i(n+1)}} r_k$$

n=1, . . . ,$M_i$−1, i=1, . . . ,P

3. The vector of rates $\{r_j\}$ $j \in C_n$, n=1, . . . , M−1 is lexicographically highest among all vectors that satisfy 1 and 2.

The above system is different from the previous embodiment of approximate max-min fair rate control system because it has users in a higher bearer class getting a rate allocation that is strictly larger than rates allocated to users in a lower bearer class. The corresponding Table 5 is given below.

TABLE 5

Rate Allocation Table

| Search Sequence | 384 Kb/s Bearer (Class 1) | 128 Kb/s bearer (Class 2) | 64 Kb/s bearer (Class 3) | Possible Rate Increase class (change class) |
|---|---|---|---|---|
| 1 | 479.0 | 162.3 | 82.5 | — |
| 2 | 400.54 | 162.3 | 82.5 | 1 |
| 3 | 320.7 | 162.3 | 82.5 | 1 |
| 4 | 240.9 | 162.3 | 82.5 | 1 |
| 5 | 240.9 | 162.3 | 63.9 | 3 |
| 6 | 240.9 | 82.5 | 63.9 | 2 |
| 7 | 162.3 | 82.5 | 63.9 | 1 |
| 8 | 162.3 | 82.5 | 43.4 | 3 |
| 9 | 162.3 | 43.4 | 23 | 2 |
| 10 | 82.5 | 43.4 | 23 | 1 |
| 11 | 82.5 | 43.4 | 0 | 3 |
| 12 | 82.5 | 23 | 0 | 2 |
| 13 | 43.4 | 23 | 0 | 1 |
| 14 | 43.4 | 0 | 0 | 3 |
| 15 | 23 | 0 | 0 | 3 |
| 16 | 0 | 0 | 0 | 3 |

In another alternative embodiment, a rate control system is provided that attempts to provide a rate allocation that is proportional to the bearer rate. In order to keep the system simple, the table is constructed by reducing the rates of each class in succession. Note that this allocation strategy is appropriate when subscribers pay a high premium for high bearer rates. The following Table 6 is the corresponding table.

TABLE 6

Rate Allocation Table

| Search Sequence | 384 Kb/s Bearer (Class 1) | 128 Kb/s bearer (Class 2) | 64 Kb/s bearer (Class 3) | Possible Rate Increase class (change class) |
|---|---|---|---|---|
| 1 | 479.0 | 162.4 | 82.5 | |
| 2 | 400.5 | 162.4 | 82.5 | 1 |

TABLE 6-continued

Rate Allocation Table

| Search Sequence | 384 Kb/s Bearer (Class 1) | 128 Kb/s bearer (Class 2) | 64 Kb/s bearer (Class 3) | Possible Rate Increase class (change class) |
|---|---|---|---|---|
| 3 | 400.5 | 82.5 | 82.5 | 2 |
| 4 | 400.5 | 82.5 | 63.6 | 3 |
| 5 | 320.7 | 82.5 | 63.6 | 1 |
| 6 | 320.7 | 82.5 | 43.3 | 3 |
| 7 | 240.9 | 82.5 | 43.3 | 1 |
| 8 | 240.9 | 43.3 | 43.3 | 2 |
| 9 | 240.9 | 43.3 | 23.0 | 3 |
| 10 | 162.4 | 43.3 | 23.0 | 1 |
| 11 | 162.4 | 23.0 | 23.0 | 2 |
| 12 | 162.4 | 23.0 | 0.0 | 3 |
| 13 | 82.5 | 23.0 | 0.0 | 1 |
| 14 | 82.5 | 0.0 | 0.0 | 2 |
| 15 | 43.3 | 0.0 | 0.0 | 1 |
| 16 | 23.0 | 0.0 | 0.0 | 1 |
| 17 | 0.0 | 0.0 | 0.0 | 1 |

Additionally, a possible extension of the rate control system provides multiple priority classes. In order to adequately explain the scheme, let P denote the number of priority classes and M denote the number of rate classes. Let $C_{ij}$, i=1, . . . ,P, j=1, . . . $M_i$, denote the set of users in priority classes i=1, . . . ,P and rate classes 1, . . . , $M_i$. In the previous discussion, only the notion of a rate class existed, there was no notion of priority class. In an embodiment of a "max-min" fair rate allocation type system, the rate control system satisfies the following conditions.

$$\sum_{i=1}^{P} \sum_{j=1}^{M_i} \sum_{k \in C_i} I_k r_k \leq R_{Iub}$$

$$\min_{j \in C_{in}} r_j \geq \max_{k \in C_{i(n+1)}} r_k \quad n = 1, \ldots, M_i - 1, i = 1, \ldots, P$$

3. For any i=1, . . . ,P−1, and any n=1, . . . $M_i$, if there exists any j, j∈ $C_{in}$, such that the rate of j is not the maximum possible according to its bearer rate, then $$\min_{k \in C_{in}} r_k \geq \max_{l=i+1, P, m=1, M_l} \max_{u \in C_{in}} r_u$$

4. The vector of rates $\{r_j\}$ j∈$C_{ij}$, i=1, . . . ,P, j=1, . . . ,$M_i$−1 is lexicographically highest among all vectors that satisfy 1,2 and 3.

It is clear from condition 3, that the rates of users in priority class 1 are allocated the maximum rate according to their respective bearer class until the rates of the highest bearer class in priority class 2 are reduced to the rates of the lowest bearer class in priority class 1. This provides service differentiation between priority classes 1 and 2.

In the example above with the case for two priority classes, an embodiment of the new search table is shown as Table 7. The "change class" for each sequence is indicated using a hyphenated notation (priority class-bearer class). The rest of the procedure is similar to the case with a single class.

TABLE 7

Search sequences for 3 bearer rates and two priority classes

| Search Sequence | Priority Class 1 | | | Priority Class 2 | | | Change Class |
|---|---|---|---|---|---|---|---|
| | 1 | 2 | 3 | 1 | 2 | 3 | |
| 1 | 479.0 | 162.3 | 82.5 | 479.0 | 162.3 | 82.5 | — |
| 2 | 479.0 | 162.3 | 82.5 | 400.54 | 162.3 | 82.5 | 2-1 |
| 3 | 479.0 | 162.3 | 82.5 | 320.7 | 162.3 | 82.5 | 2-1 |
| 4 | 479.0 | 162.3 | 82.5 | 240.9 | 162.3 | 82.5 | 2-1 |
| 5 | 479.0 | 162.3 | 82.5 | 162.3 | 162.3 | 82.5 | 2-1 |
| 6 | 479.0 | 162.3 | 82.5 | 162.3 | 82.5 | 82.5 | 2-2 |
| 7 | 479.0 | 162.3 | 82.5 | 82.5 | 82.5 | 82.5 | 2-1 |
| 9 | 400.54 | 162.3 | 82.5 | 82.5 | 82.5 | 82.5 | 1-1 |
| 10 | 320.7 | 162.3 | 82.5 | 82.5 | 82.5 | 82.5 | 1-1 |
| 11 | 240.9 | 162.3 | 82.5 | 82.5 | 82.5 | 82.5 | 1-1 |
| 12 | 162.3 | 162.3 | 82.5 | 82.5 | 82.5 | 82.5 | 1-1 |
| 13 | 162.3 | 82.5 | 82.5 | 82.5 | 82.5 | 82.5 | 1-2 |
| 14 | 82.5 | 82.5 | 82.5 | 82.5 | 82.5 | 82.5 | 1-1 |
| 15 | 82.5 | 82.5 | 82.5 | 82.5 | 82.5 | 63.9 | 2-3 |
| 16 | 82.5 | 82.5 | 82.5 | 82.5 | 63.9 | 63.9 | 2-2 |
| 17 | 82.5 | 82.5 | 82.5 | 82.5 | 63.9 | 43.4 | 2-3 |
| 18 | 82.5 | 82.5 | 82.5 | 82.5 | 43.4 | 43.4 | 2-2 |
| 19 | 82.5 | 82.5 | 82.5 | 43.4 | 43.4 | 43.4 | 2-1 |
| 20 | 82.5 | 82.5 | 43.4 | 43.4 | 43.4 | 43.4 | 1-3 |
| 21 | 82.5 | 43.4 | 43.4 | 43.4 | 43.4 | 43.4 | 1-2 |
| 22 | 43.4 | 43.4 | 43.4 | 43.4 | 43.4 | 43.4 | 1-1 |
| 23 | 43.4 | 43.4 | 43.4 | 43.4 | 43.4 | 23.0 | 2-3 |
| 24 | 43.4 | 43.4 | 43.4 | 43.4 | 23.0 | 23.0 | 2-2 |
| 25 | 43.4 | 43.4 | 43.4 | 23.0 | 23.0 | 23.0 | 2-1 |
| 26 | 43.4 | 43.4 | 23.0 | 23.0 | 23.0 | 23.0 | 1-3 |
| 27 | 43.4 | 23.0 | 23.0 | 23.0 | 23.0 | 23.0 | 1-2 |
| 28 | 23.0 | 23.0 | 23.0 | 23.0 | 23.0 | 23.0 | 1-1 |

The above described rate control system and embodiments thereof can be implemented asynchronously as described above or synchronously say every T msec. Some improvement gain may be lost with the synchronous version, but the CPU consumption with the synchronous version may be more attractive.

The rate control system can be adapted to operate in different wireless communication system architectures. For example, an RNC can have a distributed computing architecture where traffic processing cards handle the routing and rate control functionality between the core network and the Node Bs for users. Each Node B is assigned a traffic processor card (TFC) at the RNC. When a user accesses the network, the user may be assigned the least loaded traffic processor card at the RNC. A traffic processor card may support users from multiple Node Bs. Each Node B has an ATM virtual circuit to a particular traffic processor card. From that traffic processor card, traffic for different users are switched to the traffic processor card assigned to the different users to be processed. So, by measuring short term link occupancy, whether to turn on/off rate control systems can be decided. Let the traffic processor card (TPC) that a Node B communicates with be denoted as $TPC_{assigned}$. $TPC_{assigned}$ can count the number of AAL2 identifiers that has traffic arrived per TTI (20 ms. intervals). That number is the N denoted above. $N_p$ can be derived by observing the average link occupancy during the past decision interval. If the computation indicates that the maximum transport format indicator TFI or j in our example of some users for that Node B needs to be adjusted, $TPC_{assigned}$ will send messages to all relevant TPC cards to perform such adjustments. To minimize such messages, all users from that Node B for one TPC card will be adjusted first before we adjust users that are processed in other TPC cards. For the mixed service case, the $TPC_{assigned}$ card needs to have the information on the service type that each user is using.

Due to the bursty nature of data applications such as web browsing and file transfers, the Iub bandwidth may not be sufficient to handle the instantaneous load during some periods. Accordingly, the rate control system of FIG. 2 modifies the TFB of a subset of the active users when all the users had the same peak bearer rate allocation. Additionally, a rate control system is described using a simple lookup table search for the case of users in different bearer rates or composite services. In the absence of such rate control systems, the Iub interface could be overwhelmed by the data traffic. Such a condition could potentially affect all the users at the RNC. In embodiments described above, the rate control system changes the rate of a user on the link within a bearer rate, and the bearer rate remains the same for a user at least for the duration of a connection. Embodiments are possible for the rate control system to operate within a wireless communications system where the bearer rate for a user changes during the connection, but such an embodiment may require over the air signaling.

In certain embodiments, the rate control system throttles the actual rates of users with larger service rate first. Another variation of the rate control system is to do proportional fair share rate control where the actual rates of the users are throttled proportionally to their service rates when congestions arise. Throughout the description, the operation of the rate control system is described in terms of changing, assigning or allocating rates, but the rate control system can be described in terms of changing the TFB size for a user (to reduce the rate) as a function of the total data to be provided to the link or of the TFB size(s) assigned to at least one other user (rather than referring to the aggregate rates of the users to be transmitting data over the link).

The rate control system has been described for use in a UMTS system, but the rate control system according to the principles of the present invention can be used with different cellular systems or wireless local area network (LAN) configurations which omit and/or add components and/or use variations or portions of the described system. For example, the rate control system can be implemented in a CDMA 2000 network to adjust the data rate per user over the link between the base station controller or the mobile switching center (MSC) and a base station depending on the link load (for example, as determined by the rates assigned to other users). In general, the rate control system can control the rates assigned to users over a link between two nodes in a wireless communications system where one of the nodes establishes wireless links with wireless units or users in geographic proximity to the node. For example, the rate control system in a link of a wireless communications system can control the rate for users on the link between a first set of node or nodes (such as Access Point (AP), base station or Node B) and a second set of nodes or node (such as mobility agent, base station controller or RNC) where a communications link of an end to end communications path (from a wireless unit to a PSTN, a PDN and/or another wireless unit) includes one node of the first set and one node of the second set exclusive of the wireless unit, the PSTN, the PDN and/or the other wireless unit.

It should be understood that the system and portions thereof and of the described system can be implemented in processing circuitry at different location(s), such as the wireless unit, the base station, a base station controller, SGSN, GGSN and/or mobile switching center. Additionally, the rate control system can be implemented in application specific integrated circuits, software-driven processing circuitry, firmware, programmable logic devices, hardware, discrete components or arrangements or portions of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of sending data over a link from a node of a radio access network to a base station of said network for wireless transmission to two or more users, comprising:
    obtaining a description of loading on the link;
    selecting a respective block size for each said user from a discrete set of two or more available block sizes including a maximum block size that corresponds to a maximum rate of data transmission and at least one reduced block size that corresponds to a reduced rate of data transmission;
    mapping the data to blocks of the respectively selected sizes; and
    sending the blocks to the base station over the link, wherein:
    the maximum block size is selected for at least one user;
    a reduced block size is selected for at least one user;
    the block sizes are selected with reference to the description of link loading; and
    the number of users that are to receive reduced block sizes is determined with reference to the description of link loading.

2. The method of claim 1, wherein the selecting step comprises:
    calculating a sustainable rate $R_s$ per user;
    determining a reduced rate $R_{TFj}$ as a function of said sustainable rate $R_s$; and
    setting a number $N_L$ of users to said reduced rate $R_{TFj}$, wherein said number $N_L$ is at least a function of said sustainable rate $R_s$, the total number N of said users, and said reduced rate $R_{TFj}$.

3. The method of claim 1, wherein the users have bearer rates and the selecting step comprises: setting at least one user to a reduced rate within a bearer rate for said user.

4. The method of claim 1, wherein the users have priority classes and the selecting step comprises: setting at least one user to a reduced rate within a bearer rate and priority class for said user.

5. The method of claim 1, wherein the mapping step comprises mapping the data to transport format blocks, each of which is formed from one or more transport blocks, and the selecting step comprises:
    selecting a size of a transport format block for at least one user by changing the number of transport blocks used to form said transport format block as a function of the size of transport format blocks of at least one other user.

* * * * *